United States Patent [19]
Shimizu

[11] Patent Number: 5,946,606
[45] Date of Patent: Aug. 31, 1999

[54] INTERNAL WRAP TEST CIRCUIT IN RADIO EQUIPMENT AND TEST METHOD THEREOF

[75] Inventor: Toshihisa Shimizu, Tokyo, Japan

[73] Assignee: Oki Electric Industry Co., Ltd., Tokyo, Japan

[21] Appl. No.: 08/944,406

[22] Filed: Oct. 6, 1997

[30] Foreign Application Priority Data

Apr. 23, 1997 [JP] Japan .................................. 9-105915

[51] Int. Cl.⁶ .......................... H04B 17/00; H01Q 11/12
[52] U.S. Cl. ...................... 455/67.1; 485/126; 485/226.1
[58] Field of Search .................. 455/67.1, 67.4, 455/103, 78, 126, 272, 423, 425, 226.1

[56] References Cited

U.S. PATENT DOCUMENTS

| | | | |
|---|---|---|---|
| 3,783,192 | 1/1974 | Takahashi | 38/122 |
| 4,984,293 | 1/1991 | Cummings et al. | 455/226 |
| 5,109,535 | 4/1992 | Kume et al. | 455/67.4 |
| 5,471,146 | 11/1995 | Krayeski et al. | 455/67.1 |
| 5,701,595 | 12/1997 | Green, Jr. | 455/117 |

FOREIGN PATENT DOCUMENTS

B-90447/91  8/1992  Finland ................. 455/67.4

Primary Examiner—David R. Hudspeth
Assistant Examiner—Meless Zewdu
Attorney, Agent, or Firm—Venable; Robert J. Frank; James R. Burdett

[57] ABSTRACT

The present invention provides an internal wrap test circuit in a radio equipment which is capable of conducting an internal wrap test, which radio equipment including two transmitting systems in which a transmission signal is amplified by a power amplifier and the amplified transmission signal is outputted in such a manner as to be changed over by a changeover switch to first and second circulators respectively connected to a first antenna and a second antenna, and two receiving systems in which received signals inputted through the first and second antennas are respectively transmitted to a first low noise amplifier and a second low noise amplifier via said first and second circulators, respectively, wherein the internal wrap test circuit includes a local oscillator which is connected to the power amplifier and to the first and second low noise amplifiers so as to control each gain of the power amplifier and the first and second low noise amplifiers, and the transmission signal is lowered to a fixed level to be made into a received signal by using each backward path of the transmission changeover switch and the first and second circulators.

6 Claims, 4 Drawing Sheets

F I G. 2
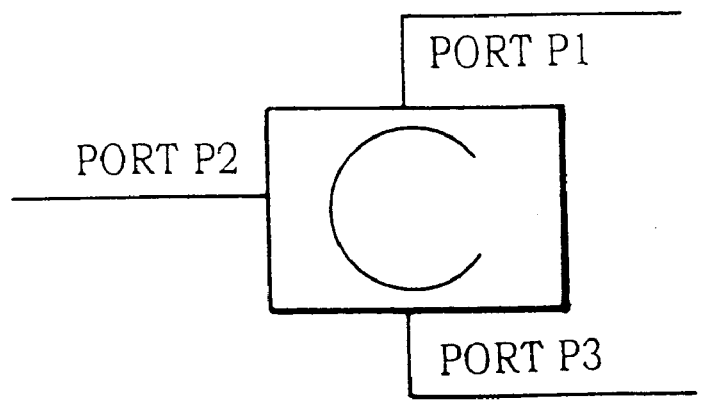
F I G. 3
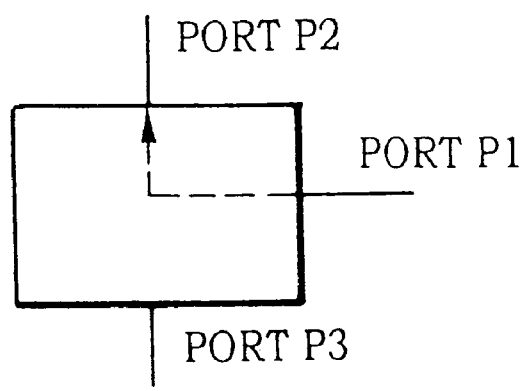

INTERNAL WRAP TEST CIRCUIT IN RADIO EQUIPMENT AND TEST METHOD THEREOF

BACKGROUND OF THE INVENTION

1. Field of the Invention

The present invention relates to an internal wrap test circuit applied to a radio equipment and a test method thereof.

2. Description of the Related Art

Generally, a radio equipment in which a transmission changeover switch and a circulator as a sharing unit for transmit/receive waves are used is not provided with an internal wrap test circuit.

Since the above-described radio equipment does not have an internal wrap test circuit, a wrap test cannot be conducted when an antenna is not connected or an abnormal connection of an antenna occurs.

SUMMARY OF THE INVENTION

It is an object of the present invention to provide, in a radio equipment, an internal wrap test circuit which can conduct a wrap test even when an antenna is not connected or abnormal connection of an antenna occurs.

In order to achieve the above-described object, there is provided in the present invention an internal wrap test circuit in a radio equipment, which radio equipment including two transmitting systems in which a transmission signal is amplified by a power amplifier and the amplified transmission signal is outputted in such a manner as to be changed over by a changeover switch to first and second circulators respectively connected to a first antenna and a second antenna, and two receiving systems in which received signals inputted through the first and second antennas are respectively transmitted to a first low noise amplifier and a second low noise amplifier via the first and second circulators, respectively, wherein the internal wrap test circuit includes a local oscillator which is connected to the power amplifier and to the first and second low noise amplifiers so as to control each gain of the power amplifier and the first and second low noise amplifiers, and the transmission signal is lowered to a fixed level to be made into a received signal by using each backward path of the transmission changeover switch and the first and second circulators.

Further, in the present invention, there is also provided an internal wrap test method in a radio equipment, which radio equipment including two transmitting systems in which a transmission signal is amplified by a power amplifier and the amplified transmission signal is thereafter outputted in such a manner as to be changed over by a changeover switch to first and second circulators which are respectively connected to first and second antennas, and two receiving systems in which received signals inputted through the first and second antennas are respectively transmitted to a first low noise amplifier and a second low noise amplifier via said first and second circulators, wherein the method comprises the steps of: changing over the transmission changeover switch, which is set to be connected to the first circulator, to the second circulator, and transmitting the transmission signal amplified by the power amplifier to the second circulator; lowering the transmission signal to a fixed level in such a manner that the second circulator, which is usually rotated in a direction in which the second circulator is connected to the second antenna, is rotated in a reverse direction, and outputting the transmission signal as a received signal to the second low noise amplifier; changing over the transmission changeover switch, which is set to be connected to the second circulator, to the first circulator, and transmitting the transmission signal amplified by the power amplifier to the first circulator; and lowering the transmission signal to a fixed level in such a manner that the first circulator, which is usually rotated in a direction in which the first circulator is connected to the first antenna, is rotated in a reverse direction, and outputting the transmission signal as a received signal to the first low noise amplifier.

BRIEF DESCRIPTION OF THE DRAWINGS

FIG. 2 is a structural diagram of a circulator.

FIG. 3 is a structural diagram of a transmission changeover switch.

DESCRIPTION OF THE PREFERRED EMBODIMENTS

Figure 1:
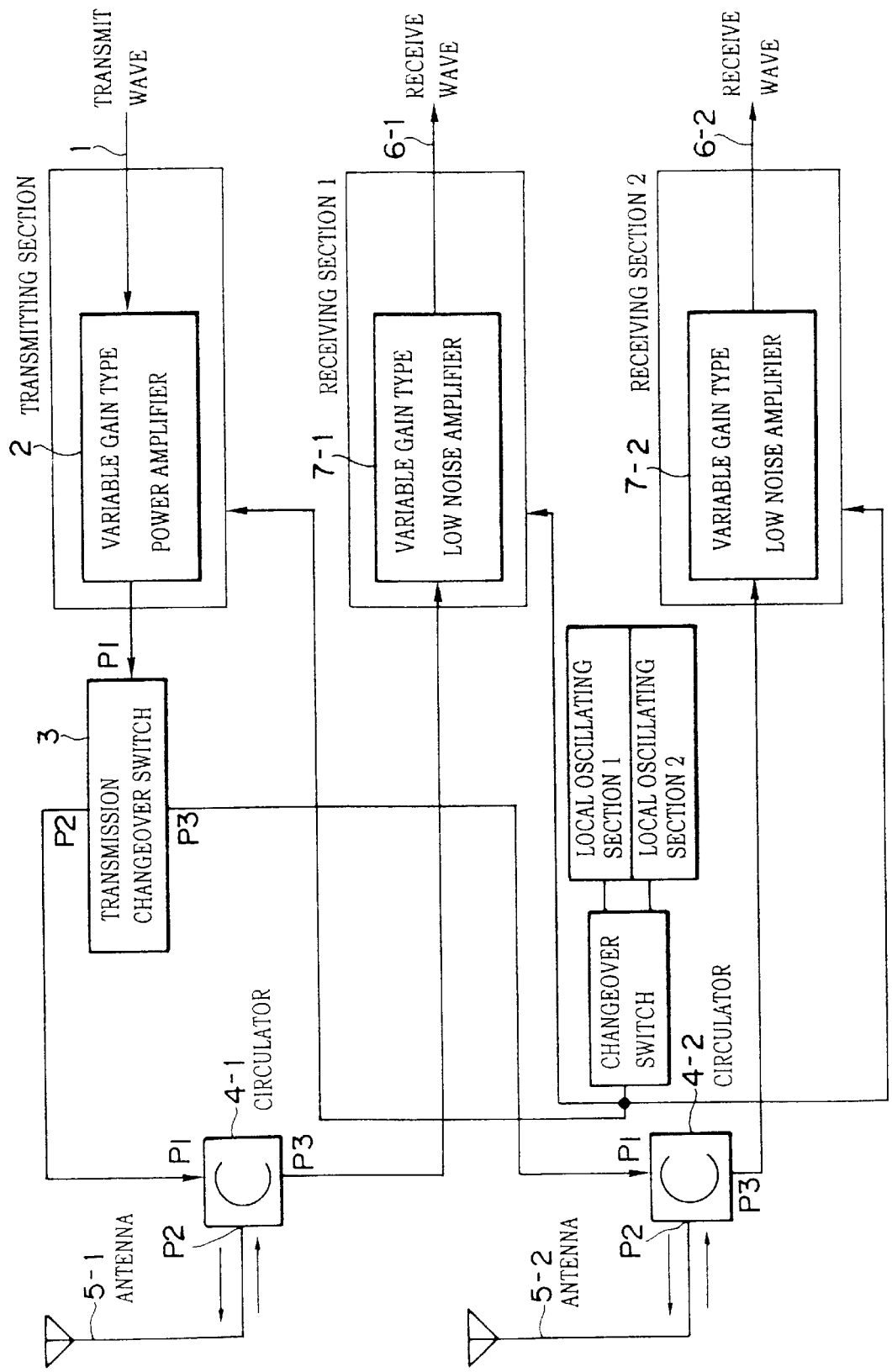
FIG. 1 is a block structural diagram relating to an embodiment of the present invention.

FIG. 1 is a block structural diagram relating to an embodiment of the present invention.

In a first transmitting/receiving system, a transmit wave 1 is amplified by a variable gain type power amplifier 2 of a transmitting section and is outputted to an antenna 5-1 via a it transmission changeover switch 3 and a circulator 4-1.

On the other hand, a receive wave 6-1 is inputted from the antenna 5-1 to a variable gain type low noise amplifier 7-1 of a receiving section 1 via the circulator 4-1. A local oscillator has a structure which consists of a local oscillating section 1 having the above first transmitting/receiving system and a local oscillating section 2 having a second transmitting/receiving system which will be described later.

The local oscillator is a highly stable oscillator having a frequency band of 1.6 GHz of a general radio station signaling system and is used in common for a transmitting operation and a receiving operation. A transmit intermediate frequency (230 MHz band) is mixed with a signal from the local oscillator to be converted to a high frequency band (i.e., 1.9 GHz).

Further, the receive frequency band (i.e., 1.9 GHz) is mixed with a signal from the local oscillator to be converted to a received intermediate frequency band (i.e., 240 MHz).

In the case of a second transmitting/receiving system, the transmit wave 1 is amplified by the variable gain type power amplifier 2 of a transmitting section and is outputted to an antenna 5-2 via the transmission changeover switch 3 and a circulator 4-2.

On the other hand, a receive wave 6-2 is inputted from the antenna 5-2 to a variable gain type low noise amplifier 7-2 of a receiving section 2 via the circulator 4-2.

FIG. 2 is the structural diagram of the circulators 4-1, 4-2 shown in FIG. 1 (in this drawing, counterclockwise rotation is shown).

As shown in FIG. 2, the circulator includes three input/output ports P1, P2, and P3. When a line of characteristic impedance of 50ω is connected to each of the ports, a signal inputted to any one of the ports is characterized by rotating in a fixed direction of rotation (in a clockwise or counterclockwise direction) to be outputted to a subsequent port at a low loss. Further, a fixed loss amount is produced with respect to the rotation of a backward direction.

FIG. 3 is the structural diagram of the transmission changeover switch 3 shown in FIG. 1 (in this drawing, output to the port 2 is shown).

As shown in FIG. 3, the transmission changeover switch 3 includes three input/output ports P1, P2, and P3 and a signal fed to the port P1 is outputted to the port P2 or to the port P3 at a low loss. When the connection between the port P1 and the port P2 is set, change-over to the path between the port P1 and the port P3 causes a fixed loss amount (when the connection between the port P1 and the port P3 is set, change-over to the path between the port P1 and the port P2 also causes a fixed loss amount).

As described above, by controlling each gain of the variable gain type power amplifier 2 of the transmitting section, the variable gain type low noise amplifier 7-1 in the receiving section 1, and the variable gain type low noise amplifier 7-2 in the receiving section 2, and using each backward-direction path of the transmission changeover switch 3 and the circulators 4-1, 4-2, an internal wrap test can be conducted with the transmit wave 1 being lowered to a fixed level to be made into the receive waves 6-1, 6-2.

Figure 4:
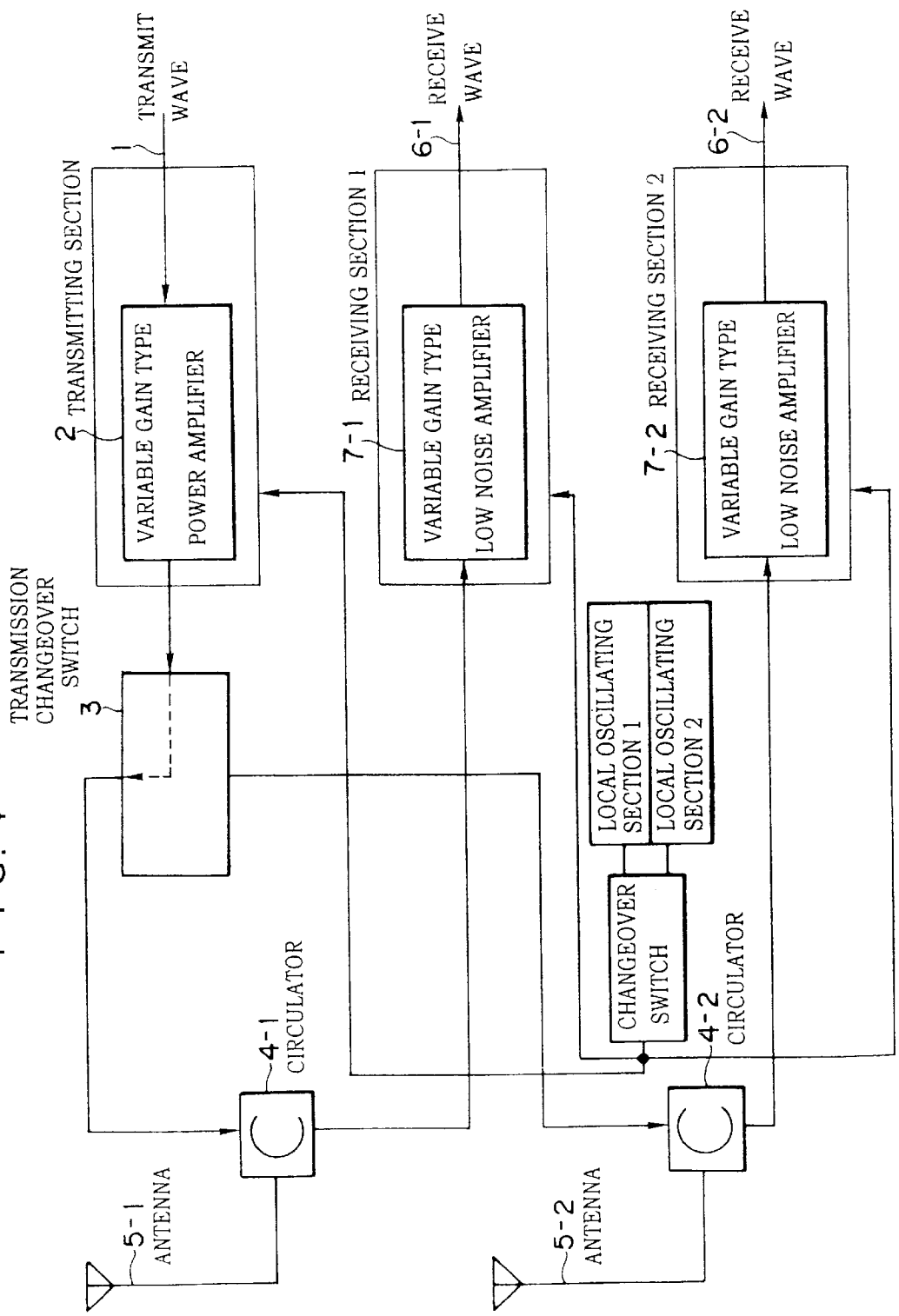
FIG. 4 shows a signal path (second transmitting/receiving system) during a wrap test.

FIG. 4 shows a signal path during a wrap test (a second transmitting/receiving system).

As shown in FIG. 4, during the wrap test in the second transmitting/receiving system, the transmit wave 1 is amplified by a gain which is controlled fixedly by the variable gain type power amplifier 2 of the transmitting section. Here, although the transmission changeover switch 3 is set to be connected to the path between the port P1 and the port P2, the transmit wave 1 is inputted by a control signal to the port P1 of the circulator 4-2 by way of a backward-direction path (from the port P1 to the port P3) of the transmission changeover switch 3.

The circulator 4-2 is provided to rotate in a counterclockwise direction. The signal inputted to the port P1 is usually outputted to the port P2. However, during the wrap test, a signal outputted to a path in a clockwise direction (from the port P1 to the port P3) is used. The signal outputted to the port P3 is fed as the receive wave 6-2 to the variable gain type low noise amplifier 7-2 of the receiving section 2.

The above-described local oscillator having a first transmitting/receiving system and a second transmitting/receiving system is provided to operate for the transmitting and receiving operations independently in each of the local oscillating sections 1, 2.

Figure 5:
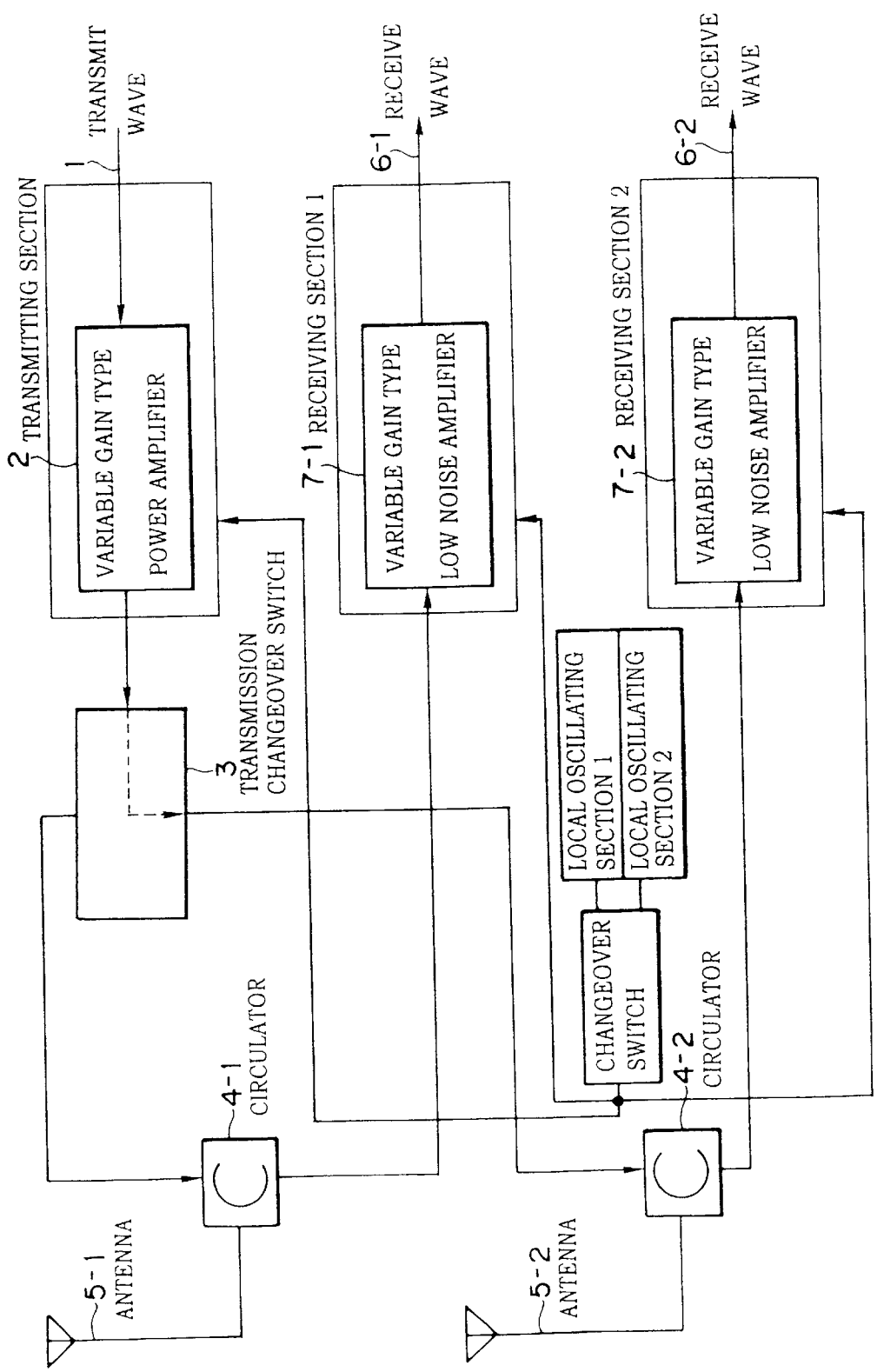
FIG. 5 shows a signal path (first transmitting/receiving system) during a wrap test.

FIG. 5 shows a signal path during the wrap test: (a first transmitting/receiving system).

As shown in FIG. 5, during the wrap test in the first transmitting/receiving system, the transmit wave 1 is amplified by the gain which is controlled fixedly by the variable gain type power amplifier 2 of the transmitting section. Here, although the transmission changeover switch 3 is set to be connected to the path between the port PI and the port P3, the transmit wave 1 is inputted by a control signal to the port PI of the circulator 4-1 by way of a path in a backward direction of the transmission changeover switch 3 (from the port P1 to the port P2).

The circulator 4-1 is provided to rotate in a counterclockwise direction. The signal inputted to the port P1 is usually outputted to the port P2. However, during the wrap test, a signal outputted to the path in a direction of backward rotation (from the port P1 to the port P3) is used. The signal outputted to the port P3 is fed as the receive wave 6-1 to the variable gain type low noise amplifier 7-1 of the receiving section 1.

As described above, according to the present invention, a wrap test can be conducted in an interior of a radio equipment by a wrap with each backward-direction path of a transmission changeover switch and circulators even when an antenna is not connected or abnormal connection of an antenna occurs.

What is claimed is:

1. An internal wrap test circuit in a radio equipment, said radio equipment including two transmitting systems in which a transmission signal is amplified by a power amplifier and the amplified transmission signal is outputted in such a manner as to be changed over by a changeover switch to first and second circulators respectively connected to a first antenna and a second antenna, and two receiving systems in which received signals inputted through the first and second antennas are respectively transmitted to a first low noise amplifier and a second low noise amplifier via said first and second circulators, respectively, wherein the internal wrap test circuit includes a local oscillator which is connected to the power amplifier and to the first and second low noise amplifiers so as to control each gain of the power amplifier and the first and second low noise amplifiers, and the transmission signal is lowered to a fixed level to be made into a received signal by using each backward path of the transmission changeover switch and the first and second circulators.

2. An internal wrap test circuit of a radio equipment according to claim 1, wherein the power amplifier and the low noise amplifiers are each formed as a variable amplifier.

3. An internal wrap test circuit of a radio equipment according to claim 2, wherein the local oscillator is formed by two local oscillating sections which respectively effect transmitting and receiving operations independently in the two transmitting/receiving systems.

4. An internal wrap test method in a radio equipment, said radio equipment including two transmitting systems in which a transmission signal is amplified by a power amplifier and the amplified transmission signal is thereafter outputted in such a manner as to be changed over by a changeover switch to first and second circulators which are respectively connected to first and second antennas, and two receiving systems in which received signals inputted through the first and second antennas are respectively transmitted to a first low noise amplifier and a second low noise amplifier via said first and second circulators, said method comprising the steps of:

changing over the transmission changeover switch, which is set to be connected to the first circulator, to the second circulator, and transmitting the transmission signal amplified by the power amplifier to the second circulator;

lowering the transmission signal to a fixed level in such a manner that the second circulator, which is usually rotated in a direction in which the second circulator is connected to the second antenna, is rotated in a reverse direction, and outputting the transmission signal as a received signal to the second low noise amplifier;

changing over the transmission changeover switch, which is set to be connected to the second circulator, to the first circulator, and transmitting the transmission signal amplified by the power amplifier to the first circulator; and lowering the transmission signal to a fixed level in such a manner that the first circulator, which is usually rotated in a direction in which the first circulator is connected to the first antenna, is rotated in a reverse direction, and outputting the transmission signal as a received signal to the first low noise amplifier.

5. An internal wrap test method of a radio equipment according to claim 4, wherein the power amplifier and the low noise amplifiers are each formed as a variable amplifier.

6. An internal wrap test method of a radio equipment according to claim 4, wherein the local oscillator is formed from two local oscillating sections which respectively effect transmitting and receiving operations independently in the two transmitting/receiving systems.

* * * * *